US012317887B2

(12) United States Patent
Oppedahl et al.

(10) Patent No.: US 12,317,887 B2
(45) Date of Patent: Jun. 3, 2025

(54) SYSTEM FOR ADJUSTING BOOM HINGE RAKE ANGLE OF AN AGRICULTURAL SPRAYER AND METHOD THEREOF

(71) Applicant: DEERE & COMPANY, Moline, IL (US)

(72) Inventors: Kody E. Oppedahl, Ankeny, IA (US); Thomas G. Bartlett, Ankeny, IA (US); Kevin A. Thelen, Ankeny, IA (US); Daniel J. Koenen, Ankeny, IA (US); Michael J. Sukalski, Fairmont, MN (US)

(73) Assignee: Deere & Company, Moline, IL (US)

( * ) Notice: Subject to any disclaimer, the term of this patent is extended or adjusted under 35 U.S.C. 154(b) by 81 days.

(21) Appl. No.: 17/893,568

(22) Filed: Aug. 23, 2022

(65) Prior Publication Data

US 2024/0065254 A1   Feb. 29, 2024

(51) Int. Cl.
*B66C 23/06* (2006.01)
*A01B 63/10* (2006.01)
*A01B 73/06* (2006.01)
*A01M 7/00* (2006.01)

(52) U.S. Cl.
CPC .......... *A01M 7/0075* (2013.01); *A01B 63/10* (2013.01); *A01B 73/06* (2013.01); *A01M 7/0053* (2013.01)

(58) Field of Classification Search
CPC ....... A01M 7/0075; A01B 63/10; A01B 73/06
See application file for complete search history.

(56) References Cited

U.S. PATENT DOCUMENTS

| 4,449,667 A | * | 5/1984 | Tyler | ............ | A01M 7/0075 239/169 |
| 4,643,358 A | * | 2/1987 | Jackson | ............ | A01M 7/0075 172/463 |
| 6,119,963 A | * | 9/2000 | Bastin | ............ | A01M 7/0075 239/168 |

(Continued)

FOREIGN PATENT DOCUMENTS

| EP | 3053436 A1 | 9/2017 |
| FR | 2817119 B1 | 5/2005 |

(Continued)

OTHER PUBLICATIONS

Extended European Search Report and Written Opinion issued in European Patent Application No. 23181425.2, dated Jan. 24, 2024, in 08 pages.

*Primary Examiner* — Basil S Katcheves
(74) *Attorney, Agent, or Firm* — Taft Stettinius & Hollister LLP; Stephen F. Rost

(57) ABSTRACT

A spray boom assembly includes a first boom frame and a second boom frame pivotally coupled via a hinge assembly to the first boom frame about a pivot axis. The spray boom also includes an actuator assembly for pivoting the second boom frame relative to the first boom frame. The hinge assembly includes a first joint location, a second joint location, a third joint location, a fourth joint location, and a fifth joint location. A first end of the actuator assembly is coupled to the hinge assembly at the fourth joint location and a second end thereof is coupled to the first boom frame at a sixth joint location. A spherical joint is located at at least three of the first, second, third, fourth, fifth and sixth joint locations.

20 Claims, 12 Drawing Sheets

(56) References Cited

U.S. PATENT DOCUMENTS

| | | | | |
|---|---|---|---|---|
| 7,740,190 B2* | 6/2010 | Peterson | ............ | A01M 7/0078 |
| | | | | 172/126 |
| 9,580,282 B2* | 2/2017 | Leinonen | .................. | F15B 9/02 |
| 10,212,927 B2* | 2/2019 | Bouten | ............... | A01M 7/0078 |
| 10,440,942 B2 | 10/2019 | Barker et al. | | |
| 10,925,275 B2* | 2/2021 | Bouten | ............... | A01C 23/008 |
| 2012/0237284 A1* | 9/2012 | Bouten | ............... | A01M 7/0075 |
| | | | | 403/111 |
| 2020/0085032 A1 | 3/2020 | Lasne et al. | | |
| 2020/0113167 A1* | 4/2020 | Bouten | ............... | A01M 7/0078 |
| 2021/0274771 A1 | 9/2021 | Ruppert et al. | | |

FOREIGN PATENT DOCUMENTS

| | | |
|---|---|---|
| GB | 2110062 A1 | 6/1983 |
| WO | WO 2020254136 A1 | 12/2020 |

\* cited by examiner

SYSTEM FOR ADJUSTING BOOM HINGE RAKE ANGLE OF AN AGRICULTURAL SPRAYER AND METHOD THEREOF

FIELD OF THE DISCLOSURE

The present disclosure relates to an agricultural sprayer, and in particular, to an adjustable boom hinge of an agricultural sprayer.

BACKGROUND

A conventional crop sprayer may be part of an agricultural machine or vehicle which traverses a field for dispensing a fluid such as a herbicide, pesticide, fertilizer, or other particles on crops in the field. The fluid may be sprayed from one or more nozzles coupled to a boom structure on the sprayer. Many conventional sprayers include one or more boom frames which extend transversely to a direction of forward travel of the machine or vehicle. In some instances, the one or more boom frames may extend over 100 feet from end-to-end.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more embodiments or implementations of an agricultural sprayer is described herein. In one embodiment of the present disclosure, an agricultural sprayer includes a spray boom assembly comprising a first boom frame and a second boom frame pivotally coupled via a hinge assembly to the first boom frame. The first and second boom frames are pivotally coupled about a pivot axis. The hinge assembly comprises a first joint location, a second joint location, a third joint location, a fourth joint location, and a fifth joint location. The spray boom assembly comprises an actuator assembly configured to pivot the second boom frame relative to the first boom frame such that a first end of the actuator assembly is coupled to the hinge assembly at the fourth joint location and a second end thereof is coupled to the first boom frame at a sixth joint location. In the spray boom assembly, at least three of the first, second, third, fourth, fifth and sixth joint locations comprises a spherical joint.

In one implementation of this embodiment, the first and second joint locations are located along the pivot axis.

In a second implementation, the third joint location, the fourth joint location and the fifth joint location are located offset from the pivot axis.

In a third implementation thereof, at least one of the first, second, third, fourth, fifth, and sixth joint locations comprises a pin joint.

In another implementation, each joint location comprises a pin.

In yet another implementation, the first boom frame is coupled to the hinge assembly at the fifth joint location.

In a further implementation, the second boom frame is coupled to the hinge assembly at the third joint location.

In yet a further implementation, the hinge assembly comprises a fold hinge assembly formed by a first fold hinge and a second fold hinge, the fold hinge assembly being coupled to the second boom frame at the third joint location, the first boom frame at the fifth joint location, and the actuator assembly at the fourth joint location.

In another implementation, each spherical joint remains at its respective joint location during pivotal movement of the second boom frame relative to the first boom frame.

In a further implementation, the second boom frame is movable relative to the first boom frame between an operating configuration, a shipping configuration, and a transport configuration, wherein in the shipping configuration the first boom frame and second boom frame are not coupled to one another at the first joint location via a pin and the second joint location comprises a spherical joint. The second boom frame is folded inwardly and positioned adjacent the first boom frame, wherein the second boom frame is angularly disposed relative to the second boom frame at a rake angle.

In another embodiment of the present disclosure, an agricultural sprayer includes a spray boom assembly comprising a first boom frame and a second boom frame pivotally coupled via a hinge assembly to the first boom frame. The first and second boom frames are pivotally coupled about a pivot axis, and the hinge assembly comprises a first joint location, a second joint location, a third joint location, a fourth joint location, and a fifth joint location, where the first and second joint locations are positioned along the pivot axis. The spray boom assembly further comprises an actuator assembly configured to pivot the second boom frame relative to the first boom frame such that a first end of the actuator assembly is coupled to the hinge assembly at the fourth joint location and a second end thereof is coupled to the first boom frame at a sixth joint location. The spray boom assembly, at least the first joint location or second joint location comprises a first spherical joint, the third joint location or the fifth joint location comprises a second spherical joint, and the fourth joint location or the sixth joint location comprises a third spherical joint.

In one implementation of this embodiment, a fourth spherical joint is located at one of the first, second, third, fourth, fifth, or sixth joint locations.

In another implementation, each of the first, second, and third spherical joints remain at their respective joint location during movement of the second boom frame relative to the first boom frame.

In yet another implementation, the second boom frame and the first boom frame are disposable in an operating position and a shipping configuration. In the operating configuration, the first boom frame and second boom frame are coupled to one another at the first joint location via a first pin and at the second joint location via a second pin, where the second joint location comprises a spherical joint. In the shipping configuration, the first pin is removed from the first joint location such that the second boom frame is movable relative to the first boom frame along the pivot axis and the second boom frame is folded inwardly and positioned adjacent the first boom frame. In the shipping configuration, the second boom frame is angularly disposed relative to the second boom frame at a rake angle.

In a further implementation, the spray boom assembly includes a lift assembly coupled to the second boom frame. The lift assembly comprises a fold rest bracket, a mounting bracket, at least one bumper member coupled to the fold rest bracket, a first bracket coupled to the fold rest bracket, and an adjustment rod coupled between the fold rest bracket and the mounting bracket. The adjustment rod is rotationally driven to move the second boom frame relative to the first boom frame.

In yet a further implementation, the first bracket includes an opening. In the operating configuration, the first bracket is coupled to and supports the fold rest bracket. In the shipping configuration, the first bracket is removed from the fold rest bracket and coupled to the second boom frame where the first bracket is positioned such that the first pin is disposed within the opening in the first bracket and a slot defined in the first boom frame.

In another implementation, the lift assembly comprises a guide rod coupled between the fold rest bracket and the mounting bracket, the guide rod being generally parallel to and offset from the adjustment rod.

In yet another implementation, the lift assembly comprises at least one fastener coupled to the adjustment rod, wherein the at least one fastener is loosened to allow movement of the adjustment rod relative to the mounting bracket.

In a further embodiment of the present disclosure, a method is provided for adjusting a spray boom assembly of an agricultural sprayer from a first configuration to a second configuration. The spray boom assembly comprises a first boom frame, a second boom frame, a hinge assembly including a first joint location, a second joint location, a third joint location, a fourth joint location, and a fifth joint location, a lift assembly, and an actuator assembly having a first end coupled to the hinge assembly at the fourth joint location and a second end coupled to the first boom frame at a sixth joint location. The method includes providing a spherical joint at three or more of the first, second, third, fourth, fifth and sixth joint locations. The method also includes removing a first pin from the first joint location disposed along a pivot axis, wherein the second joint location is located along the pivot axis and comprises a spherical joint. The method further includes pivoting the second boom frame about the pivot axis relative to the first boom frame via the hinge assembly, removing a first bracket from the lift assembly and coupling the first bracket to the second boom frame, and raising the second boom frame relative to the first boom frame via the lift assembly. The method includes positioning the second boom frame at a predetermined rake angle relative to the first boom frame, aligning an opening in the first bracket with a slot in the first boom frame, inserting the first pin in the opening of the first bracket and the slot in the first boom frame, and securing the second boom frame relative to the first boom frame in the second configuration.

In one implementation of this embodiment, the method includes positioning the lift assembly in contact with the first boom structure, rotatably driving an adjustment rod of the lift assembly to raise the second boom frame relative to the first boom frame, and securing one or more fasteners along the adjustment rod during the securing step.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
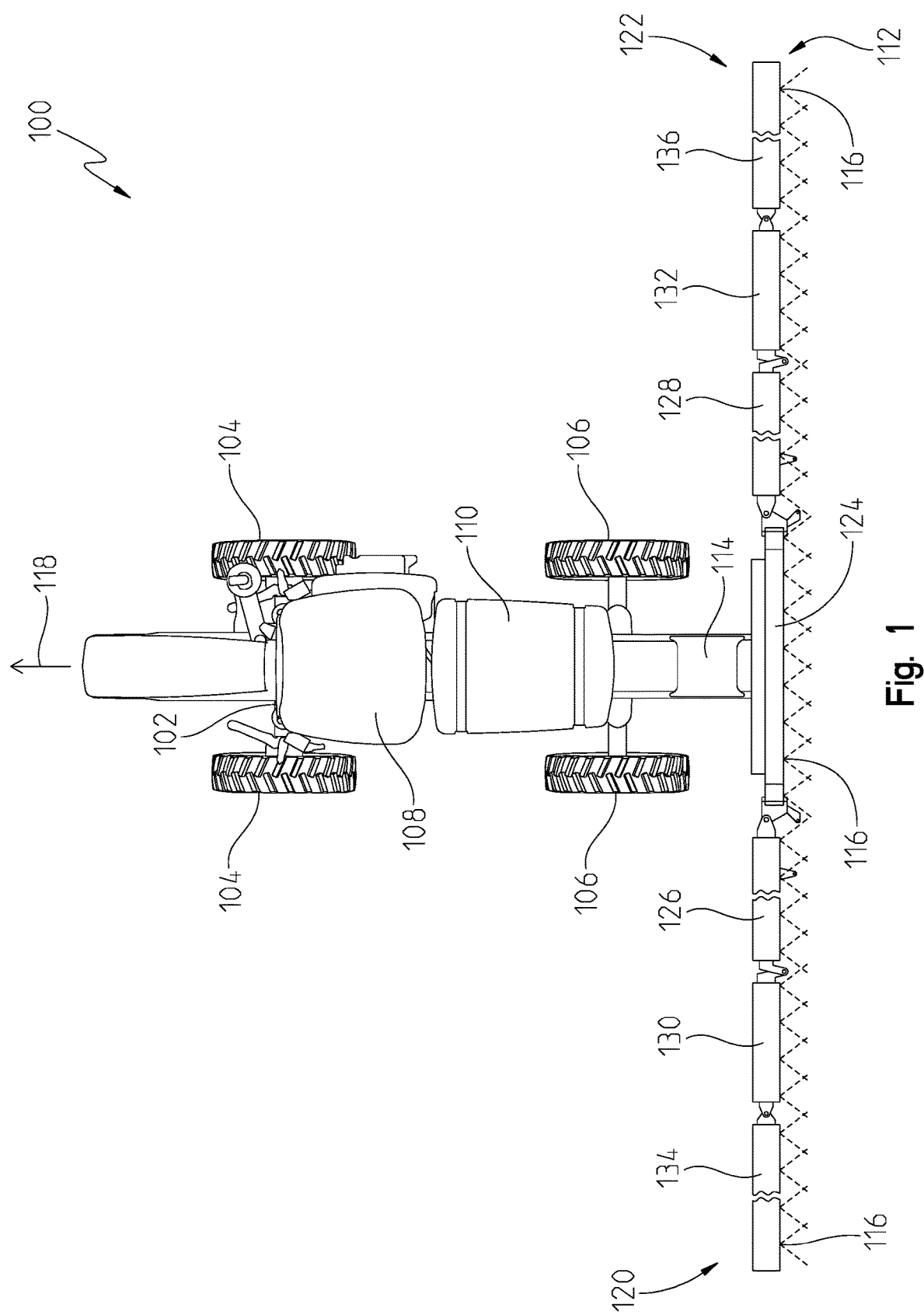
FIG. 1 is a top view of a sprayer system attached to a work machine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Referring to FIG. 1, an example of a machine or vehicle is shown carrying a spray boom with spray nozzles mounted on the boom. The vehicle may be a platform or dolly for industrial spray applications or a tractor towing ground-engaging tillage left/right wings with disks and shanks, or a planter towing a row of seed dispenser modules. In the illustrated embodiment of FIG. 1, the vehicle may comprise a towed sprayer or a self-propelled agricultural sprayer 100 including a vehicle main frame 102 and an attached autonomous control station or an operator cab 108 for controlling the sprayer 100. The main frame 102 may be supported by a plurality of ground-engaging mechanisms. In FIG. 1, a pair of front wheels 104 and a pair of rear wheels 106 support the main frame and may propel the vehicle in at least a forward travel direction 118. A tank 110 may be mounted to the frame 102 or another frame (not shown) which is attached to the main frame 102. The tank 110 may contain a spray fluid or other substance to be discharged during a spraying operation.

The sprayer or spray boom may be attached to the vehicle as shown. Alternatively, the sprayer or spray boom may be carried by the vehicle or it may form part of a self-propelled or autonomous machine. In the illustrated embodiment, however, a fixed or floating center frame 114 is coupled to a front or a rear of the main frame 102. In FIG. 1, the center frame 114 is shown coupled to the rear of the main frame 102. The center frame 114 may support an articulated folding spray boom assembly 112 that is shown in FIG. 1 in its fully extended operating or working position for spraying a field. In other examples, the spray boom assembly 112 may be mounted in front of the agricultural sprayer 100.

A plurality of spray nozzles 116 can be mounted along a fluid distribution pipe (not shown) that is mounted to the spray boom assembly 112 and fluidly coupled to the tank 110. Each nozzle 116 can have multiple spray outlets, each of which conducts fluid to a same-type or different-type of spray tip. The nozzles 116 on the spray boom assembly 112 can be divided into boom frames or wing structures such as 124, 126, 128, 130, 132, 134, and 136 (or collectively "spray section(s)"). In FIG. 1, the plurality of groups or sections may include a center boom frame 124 which may be coupled directly or indirectly to the center frame 114. Although not shown in FIG. 1, a lift actuator may be coupled to the center frame 114 at one end and to the center boom frame 124 at the opposite end for lifting or lowering the center boom frame 124.

The spray boom assembly 112 may be further divided into a first or left boom assembly 120 and a second or right boom assembly 122. In FIG. 1, the first boom assembly 120 is shown on a left side of the spray boom assembly 112, and the second boom assembly 122 is depicted on the right side thereof. In some instances, a left-most portion of the center boom frame 124 may form part of the first boom assembly 120 and a right-most portion may form part of the second boom assembly 122. In any event, the first boom assembly 120 may include those boom frames which are disposed on a left-hand side of the spray boom assembly 112 including a first inner boom frame 126 (or referred to as a "first inner wing"), a first outer boom frame 130 (or referred to as a "first outer wing"), and a first breakaway frame 134. Similarly, the second boom assembly 122 may include those boom frames which are disposed on a right-hand side of the spray boom assembly 112 including a second inner boom frame 128 (or referred to as a "second inner wing"), a second outer boom frame 132 (or referred to as a "second outer wing"), and a second breakaway frame 136. Although seven boom frames are shown, in other embodiments there may be any number of boom frames that form the spray boom assembly 112.

As shown in FIG. 1, the first boom frame 126 may be pivotally coupled to the center boom frame 124 via various mechanical couplings. Other mechanisms for coupling the first boom frame 126 to the center boom frame 124 may be used. Similarly, the first outer boom frame 130 may be coupled to the first inner boom frame 126, and the first breakaway frame 134 may be coupled to the first outer boom frame 130. In some cases, these connections may be rigid connections, whereas in other embodiments the frames may be pivotally coupled to one another. Moreover, the second inner boom frame 128 may be coupled to the center boom frame 124, and the second outer boom frame 132 may be coupled to the second inner boom frame 128. Likewise, the second breakaway frame 136 may be coupled to the second outer boom frame 136. These couplings may also be pivotal connections or rigid connections depending upon the type of boom.

In a conventional spray boom assembly, a tilt actuator may be provided for tilting each boom with respect to the center frame. In FIG. 1, for example, a first tilt actuator may be coupled at one end to the center frame 114 or the center boom frame 124, and at an opposite end to the first boom frame 120. During operation, the first boom 120 may be pivoted with respect to the center frame 114 or center boom frame 124 such that the first breakaway frame 134 may reach the highest point of the first boom 120. This may be useful if the sprayer 100 is moving in the travel direction 118 and an object is in the path of the first boom 120 such that the tilt actuator (not shown) may be actuated to raise the first boom 120 to avoid contacting the object. The same may be true of the second boom 122. Here, a second tilt actuator (not shown) may be actuated to pivot the second boom 122 with respect to the center frame 114 or the center boom frame 124.

In sprayer booms, the inner wing frame and outer wing frame may be pivotally coupled to one another about a fold hinge. There is generally a fold hinge on the inner wing frame and the outer wing frame which are coupled together via one or more pins. In FIG. 1, for example, fold hinges may be present between the first inner boom frame 126 and the first outer boom frame 130. In many conventional sprayer booms, there is at least one angle within the fold hinge. The first angle with respect to a horizontal plane is usually between 0 and 90 degrees. The first angle may be an angle defined along a backside of the inner or outer wing frame (e.g., the first inner boom frame 126 and/or first outer boom frame 130). At 0 degrees, the relationship is referred to as a "flat fold" and at a 90 degree angle the relationship is referred to as "fold over the top." At or around 0 degrees, it is possible to achieve a low folding height. However, at this angle, there are challenges with torsion when folding and with also keeping the boom frames unfolded in field operating conditions because there is no gravitational force helping to keep the boom unfolded. At or around 90 degrees, there is no torsion during folding operations and the gravitational force helps keep the boom unfolded, but it also can cause issues with the folding height which is regulated in at least the United States and Europe. Thus, it is desirable to select the angle to be between 0 and 90 degrees. In one embodiment, this angle may be set to between 5-30 degrees. In another embodiment, the angle may be set at less than 20 degrees. In a further embodiment, the angle may be set at less than 15 degrees. In a further embodiment, the angle may be set between 5 and 15 degrees.

In addition to this angle relative to the horizontal plane, a second angle referred to as a "rake angle" may be defined with respect to the vertical plane. This angle may be a compound angle at the hinge joint. A rake angle of approximately 0 degrees is desirable in that it offers the best visibility in a transport configuration (e.g., the boom frames are folded) of the sprayer. However, at this angle, the sprayer boom can be too wide to meet governmental regulations. A larger rake angle such as 6 degrees can reduce the boom width because the boom is moved up by the rake angle and a slope defined by the first angle. The larger rake angle, however, reduces the operator visibility from the cab in the transport configuration. Thus, there is a need to be able to reconfigure the sprayer frame such that optimal operator visibility is achieved in the transport configuration when the sprayer is being transported between fields and also to meet transport-on-truck governmental requirements (e.g., in the shipping configuration) when the sprayer is being shipped from a factory to a dealership. The ability to adjust the rake angle to achieve these configurations is desirable.

Figure 2:
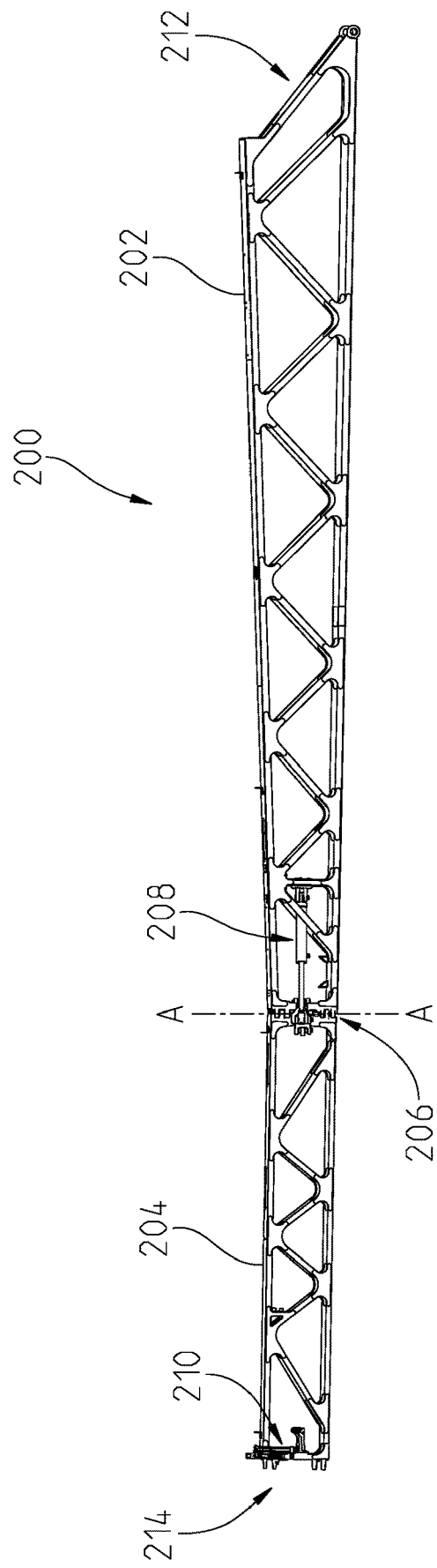
FIG. 2 is a front view of an inner wing boom frame and an outer wing boom frame configured in an operating position.

For purposes of this disclosure, there are different configurations in which the sprayer boom can be disposed in. In FIG. 2, for example, a portion of a sprayer boom is shown in an operating position 200. The sprayer boom may include an inner wing frame 202 and an outer wing frame 204. The inner wing frame 202 may be pivotally coupled to the outer wing frame 204 at a hinge joint. The hinge joint may be formed by a hinge assembly 206 which will be described in further detail below. The hinge assembly 206 may be operably coupled to an actuator assembly 208 as shown. The actuator assembly 208 may be coupled at one end to the inner wing frame 202 and to the hinge assembly 206 at an opposite end.

The end of the inner wing frame 202 opposite the hinge assembly 206 may be a first end 212, and an end of the outer wing frame 204 opposite the hinge assembly 206 may be a second end 214.

A lift assembly 210 may be coupled to the outer wing frame 204. In FIG. 2, for example, the lift assembly 210 is shown coupled at the second end 214 of the outer wing frame 204 opposite the hinge assembly 206. The lift assembly 210 will be described in further detail below.

In the operating position 200 of FIG. 2, the spray boom is in an unfolded configuration such that the outer wing frame 204 extends substantially along the same plane as the inner wing frame 202. Nozzles (not shown) may be mounted to the inner wing frame 202 and outer wing frame 204 to carry out a spraying or dispensing operation in the operating position 200. In one embodiment, in the operating position 200, the actuator assembly 208 may comprise a base end and a rod end whereby the rod end is in a fully or partially extended position.

Figure 3A:
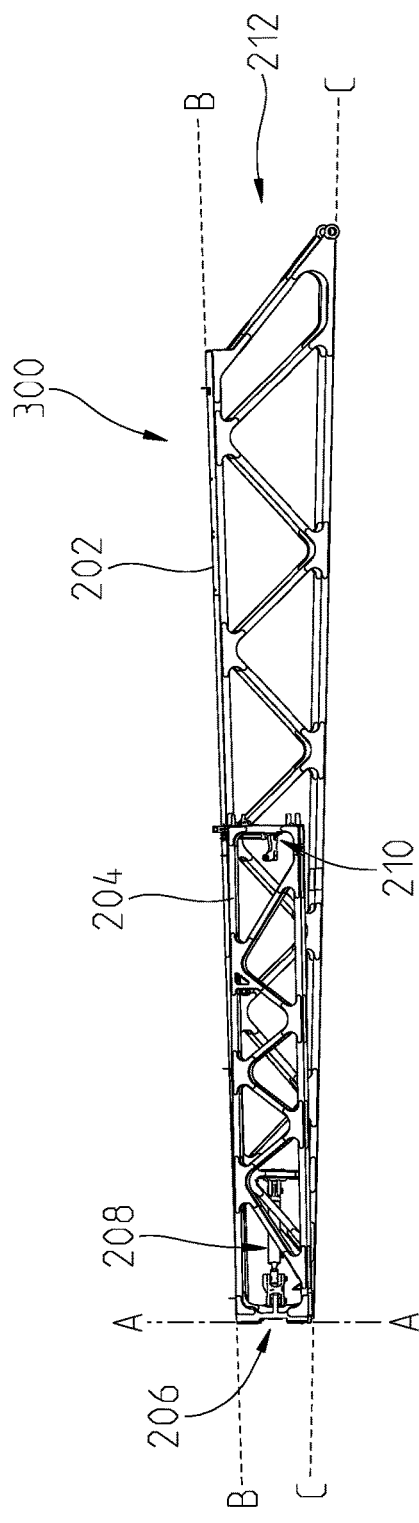
FIG. 3A is a front view of an inner wing boom frame and an outer wing boom frame configured in a transport position.
Figure 3B:
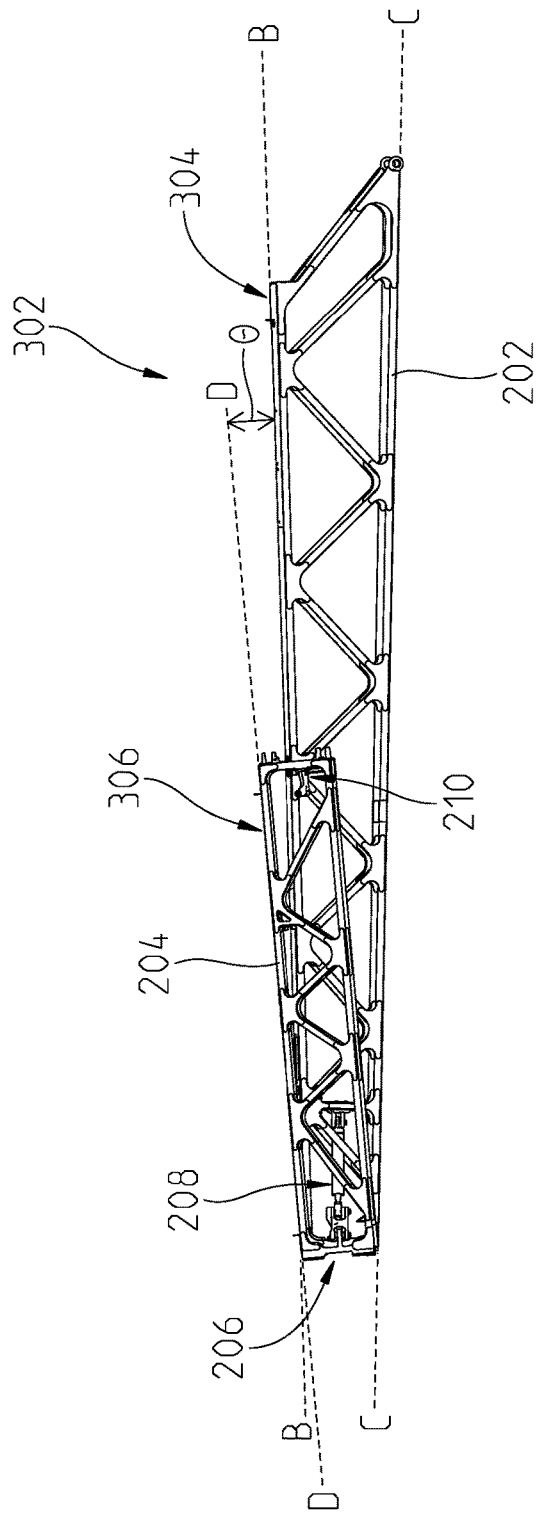
FIG. 3B is a front view of an inner wing boom frame and an outer wing boom frame configured in a shipping position.

In the operating position, the spray boom is not configured to be transported either between fields or shipped from a factory to a dealership. The spray boom has an overall width which does not allow it to be transported or shipped. Thus, the spray boom can be reconfigured into a transport position (FIG. 3A) or a shipping position (FIG. 3B). In FIG. 3A, for example, the spray boom is configured in a transport position 300. Here, the machine or vehicle may pull or otherwise transport the spray boom under its own power between fields, for example. Generally, there are fewer height and width restrictions when the spray boom is in its transport position 300. As shown in FIG. 3A, the outer wing frame 204 may be folded inward about pivot axis A-A as the rod end of the actuator assembly 208 retracts.

As shown in FIG. 3A, the inner wing frame 202 may have a top surface which is aligned along an axis B-B and a bottom surface which is aligned along an axis C-C. In the transport position 300, the outer wing frame 204 may fold inwardly along the pivot axis A-A and be disposed between axis B-B and axis C-C. With the outer wing frame 204 being located below axis B-B, this allows better visibility for the operator when seated in a cab of the machine or vehicle. More specifically, the operator is better able to see over the inner and outer wing frames when transporting the spray boom.

The overall width of the spray boom is less than in the operating position is advantageous for transporting between fields or other destinations when the machine or vehicle is operating under its own power. However, in the transport configuration, the spray boom may still be too wide to be transported on a truck or other vehicle from a factory to a dealership or other destination (e.g., a field, a farm, etc.). This is at least partly due to governmental regulations which regulate the overall height and width of an object such as a spray boom being transported on a highway or other roadway. For example, in a shipping position 302 such as the one shown in FIG. 3B, the spray boom may be disposed on a trailer being pulled by a semi or other transport vehicle. If the height and width restrictions cannot be met in the shipping position, it generally costs more to ship the spray boom.

Turning to FIG. 3B, to meet the width requirements for shipping the spray boom on a trailer, for example, it is desirable to reduce the width of the spray boom by increasing its height in the shipping position 302. In FIG. 3B, for example, the outer wing frame 204 is again folded inwardly about the pivot axis A-A but it now is positioned above axis B-B. Several features with respect to the hinge assembly 206 allow for this to be possible, and this will be described in detail below. In any event, a top surface 306 of the outer wing frame 204 is disposed above a top surface 304 of the inner wing frame 202. The top surface 306 of the outer wing frame 204 may be aligned along an axis D-D. The angle between the top surface 304 of the inner wing frame 202 (i.e., axis B-B) and the top surface 306 of the outer wing frame 204 (i.e., axis D-D) is the rake angle, $\Theta$.

If the rake angle is 0 degrees, for example, the width of the spray boom may be approximately the same as in the transport position 300. In one non-limiting example, the boom width may be over 600 mm at this rake angle. In another non-limiting example, if the rake angle, $\Theta$, is increased between 2-4 degrees, the boom width may be between 500-600 mm. In a further non-limiting example, if the rake angle, $\Theta$, is increased to at least 6 degrees, the boom width may be less than 500 mm. At the higher rake angle, the boom width may be reduced to meet governmental restrictions for transporting the spray boom on a trailer on certain roadways. As noted above, the higher rake angle is desirable for the shipping position 302 but it is less desirable for the transport position 300 because it reduces operator visibility from the cab of the machine or vehicle. Thus, it is desirable to reconfigure the outer wing frame 204 relative to the inner wing frame 202 to achieve these various positions depending on need.

In order to reconfigure the spray boom in these different positions, the hinge assembly 206 can be manipulated so that the outer wing frame 204 is able to be adjustable relative to the inner wing frame 202. Turning to FIGS. 4-8, one or more embodiments of the hinge assembly 206 is shown and described for allowing the spray boom to be disposable in the operating position 200, the transport position 300, and the shipping position 302. With the hinge assembly 206, a first portion may be coupled to the inner wing frame 202 and a second portion may be coupled to the outer wing frame 204 such that the first and second portions may be coupled together. The actuator assembly 208 in turn may be coupled to the hinge assembly 206 where extension or retraction thereof induces the outer wing frame 204 to fold inwardly with respect to the inner wing frame 202.

Figure 4:
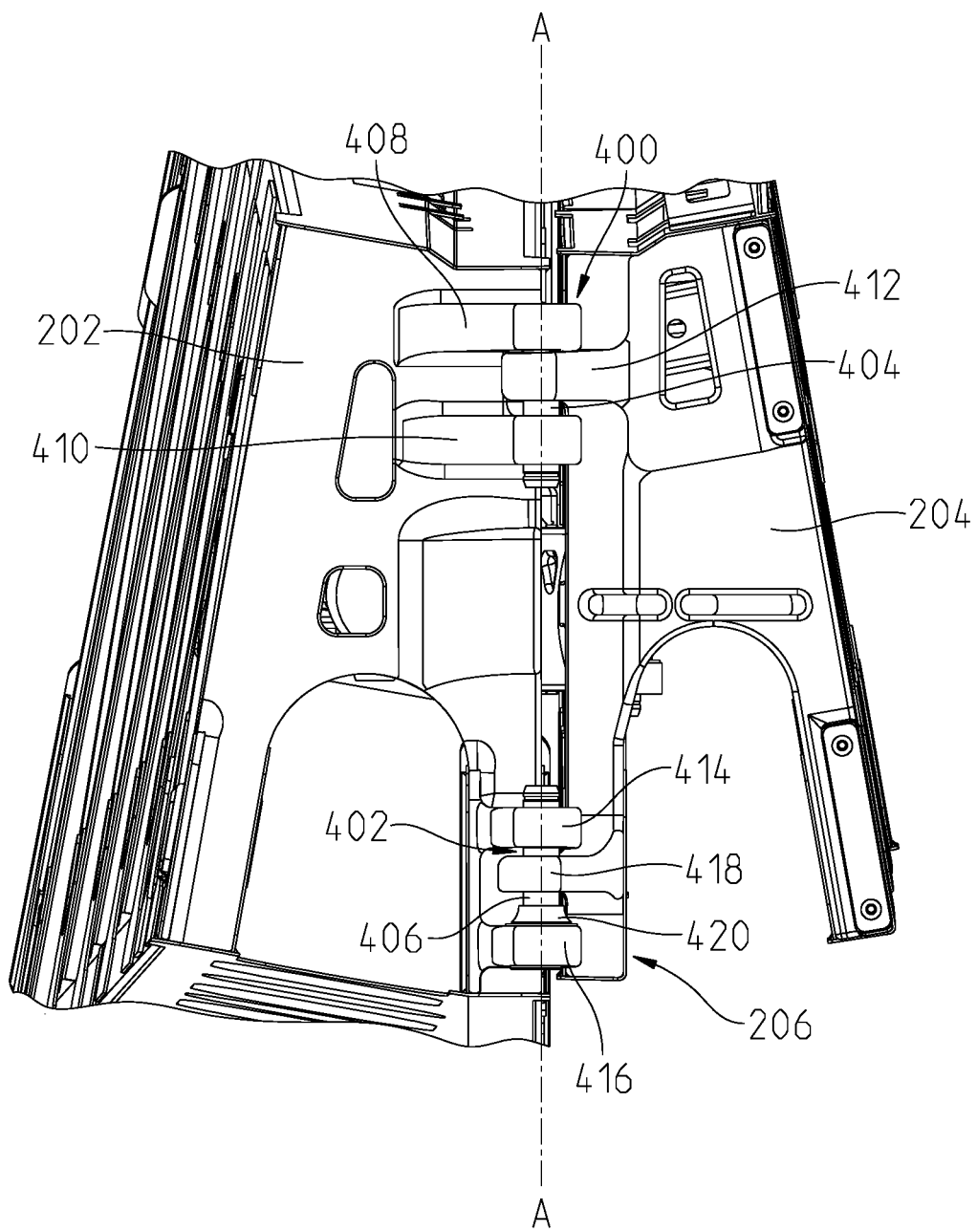
FIG. 4 is a perspective view of a hinge assembly between the inner wing boom frame and the outer wing boom frame.
Figure 8:
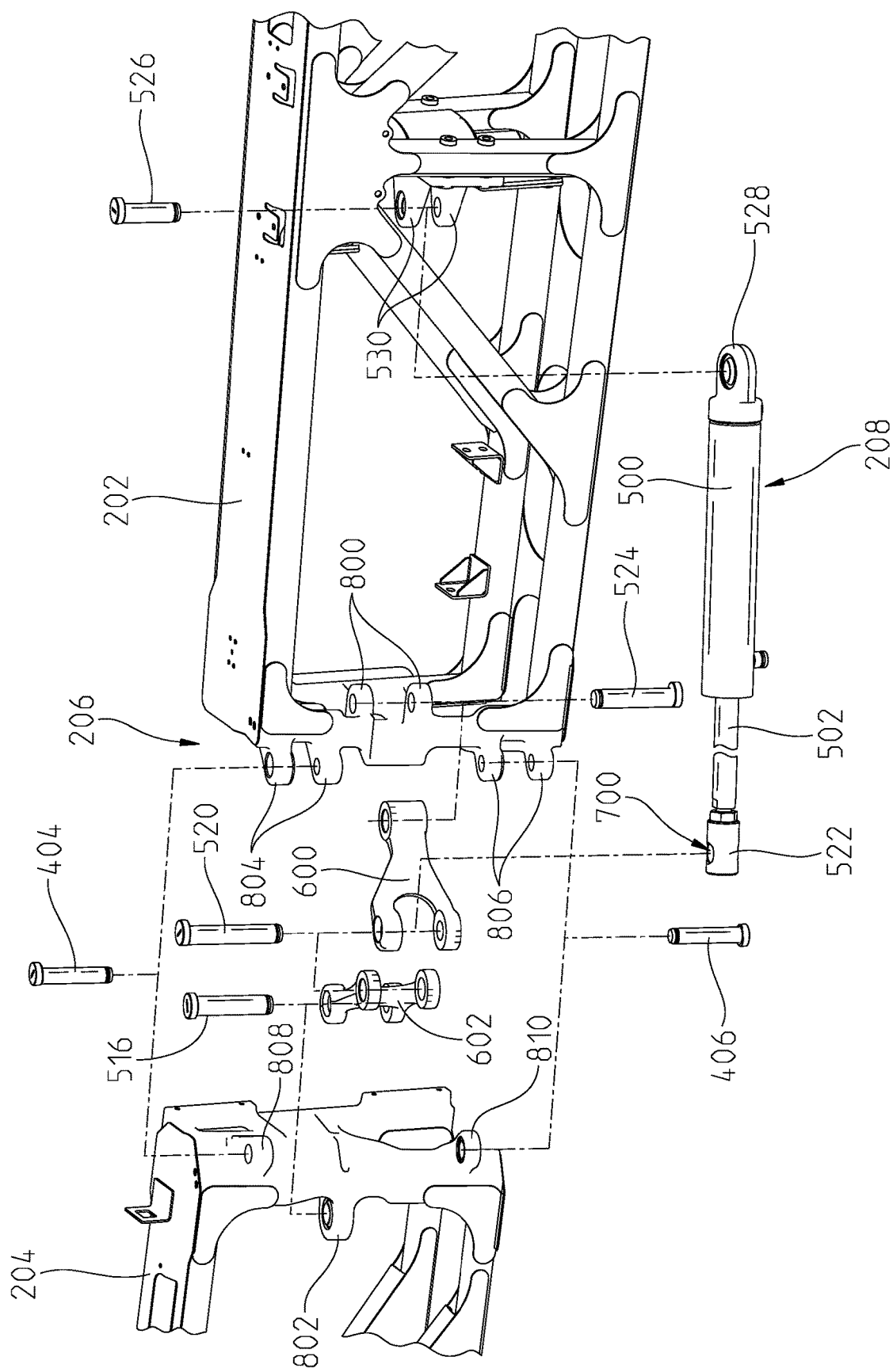
FIG. 8 is a partial exploded view of the hinge assembly of FIG. 4.

Referring to FIGS. 4 and 8, one embodiment of the hinge assembly 206 is shown. Here, the first and second portions thereof are shown coupled to the inner wing frame 202 and outer wing frame 204. In this embodiment, the inner wing frame 202 may include a first member 408 and a second member 410 spaced from one another. In FIG. 8, the first member 408 and second member 410 define openings for receiving a first pin 404. In this manner, the first member 408 and second member 410 form a second hinge coupler 804 as shown in FIG. 8. The outer wing frame 204 may include a third member 412 which, as shown in FIG. 8, also forms an opening for receiving the first pin 404. In this manner, the third member 412 forms a fifth hinge coupler 808 as shown in FIG. 8. The third member 412 may be disposed between the first member 408 and second member 410 for receiving the first pin 404. As shown in FIG. 4, the first member 408, second member 410 and third member 412 may combine to form a first hinge location 400 where the first pin 404 pivotally couples the inner wing frame 202 and outer wing frame 204 to one another.

In this embodiment, a second hinge location 402 is located below the first hinge location 400. Specifically, the inner wing frame 202 may include a fourth member 414 and a fifth member 416 spaced from one another. The fourth member 414 and fifth member 416 may define openings therethrough for receiving a second pin 406. In this way, the fourth member 414 and fifth member 416 may form a fourth hinge coupler 806 as shown in FIG. 8. The outer wing frame 204 may include a sixth member 418 which, as shown in FIG. 8, defines an opening therethrough for also receiving the second pin 406. The sixth member 418 may form a sixth hinge coupler 810. As shown in FIG. 4, the sixth member 418 may be located between the fourth member 414 and fifth member 416 for receiving the second pin 406.

In the embodiment of FIG. 4, a spherical joint may be defined at the second hinge location 402. Here, a spherical bearing 420 may be provided at the second hinge location to allow for angular rotation about the pivot axis A-A. As will be described in further detail herein, the use of spherical joints may allow the outer wing frame 204 to be reconfigured relative to the inner wing frame 202 to achieve various rake angles. In this same embodiment, the first hinge location 400 forms a pin joint. Here, there is no spherical bearing but rather only the first pin 404. In other embodiments, a spherical bearing may be located at the first hinge location 400 so that the first hinge location forms a spherical joint. In at least one embodiment, either the first or second hinge location forms a spherical joint. In yet another embodiment, the first and second hinge location may form a spherical joint.

In this disclosure, a spherical joint is described herein. A spherical joint may be a joint that allows or permits pivotal motion about two or more axes. In some embodiments, the spherical joint may be a connection between two objects that share a common point and allow free rotation in any direction about this common point of connection. In several embodiments, the spherical joint may be a connection between two objects that does not allow translation but does allow rotation in all directions. In other embodiments, the spherical joint may allow rotation about two or more perpendicular axes. In some embodiments, the spherical joint may allow rotation about three perpendicular axes. Moreover, the spherical joint may be a connection or joint between two or more objects.

In addition, a pin joint is also referred to in this disclosure. A pin joint may be a connection or joint that permits pivotal motion about only one axis. In some embodiments, a pin joint may be a connection between at least two objects that permits rotation about one axis and translation along the same axis. In other embodiments, a pin joint may be connection or joint between at least two objections that permits or allows rotation about only one axis.

Figure 5:
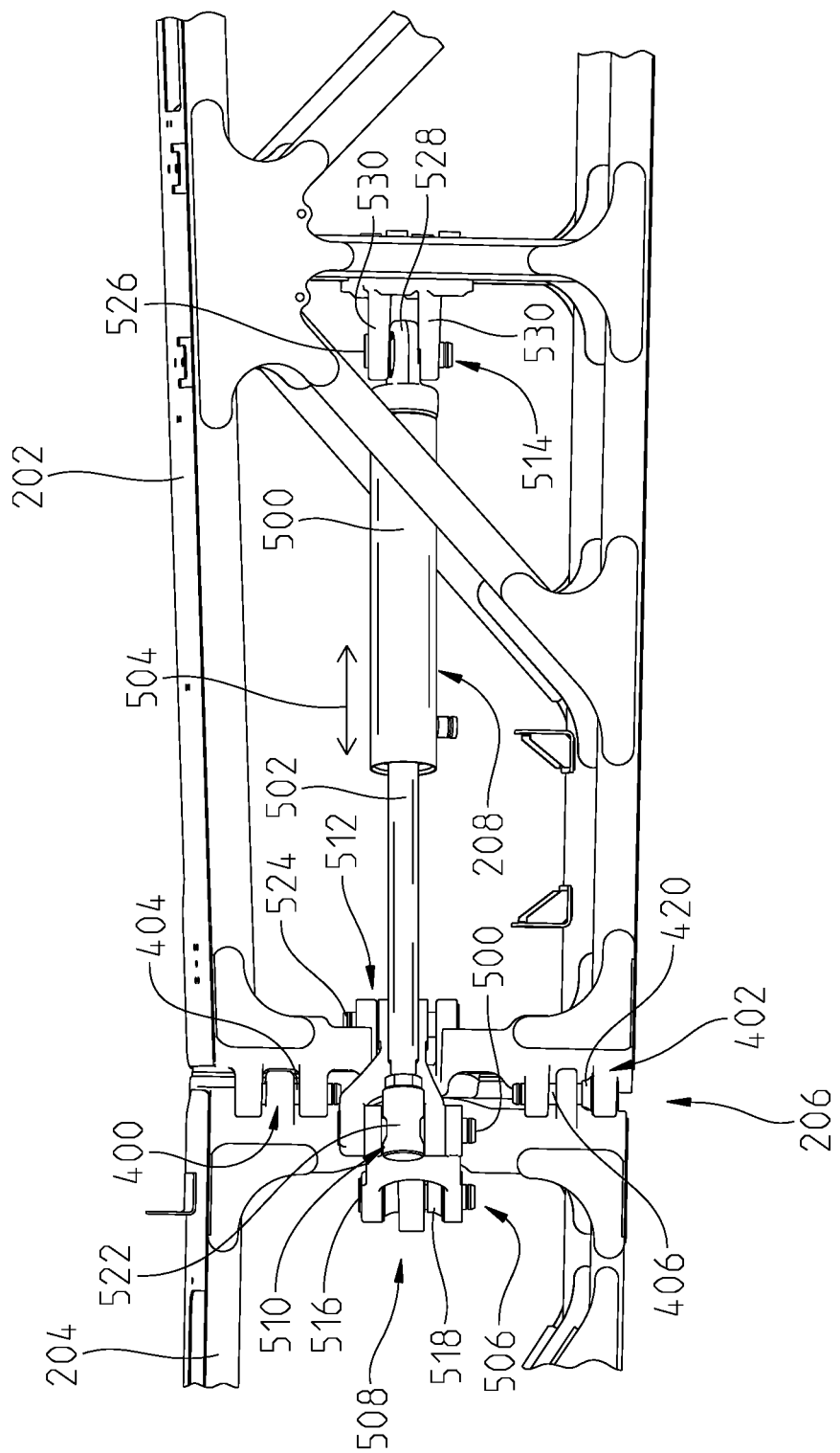
FIG. 5 is a partial front view of the hinge assembly of FIG. 4 with an actuator for controlling movement between the inner wing boom frame and the outer wing boom frame.

Referring to FIGS. 5 and 8, the inner wing frame 202 may include a pair of members which form a first hinge coupler 800. In FIG. 8, for example, the pair of members define openings therethrough which is configured to receive a fifth pin 524. As will be described, a portion of fold hinge assembly 506 may also receive the fifth pin 524 for coupling the fold hinge assembly 506 to the inner wing frame 202.

The outer wing frame 204 may also include a member which forms a second hinge coupler 802, as shown in FIG. 8. The second hinge coupler 802 defines an opening for receiving a third pin 516. Another portion of the fold hinge assembly 506 may also receive the third pin 516 for coupling the fold hinge assembly 506 to the outer wing frame 204.

Figure 6:
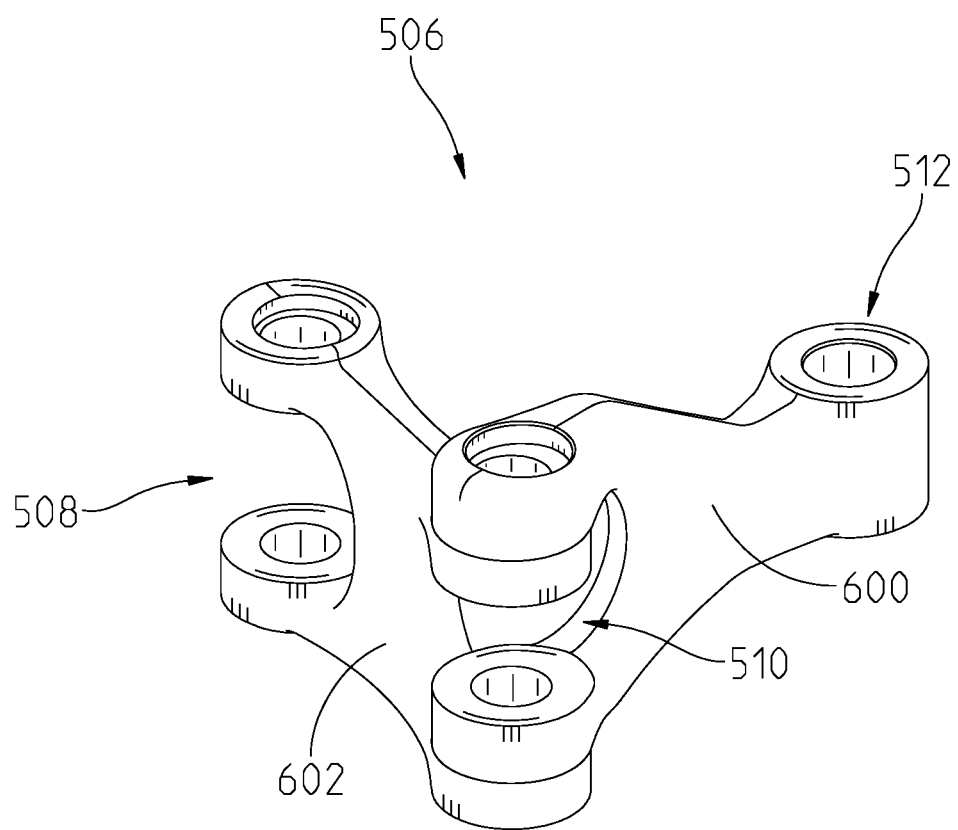
FIG. 6 is a perspective view of a fold hinge assembly of the hinge assembly of FIG. 4.
Figure 7:
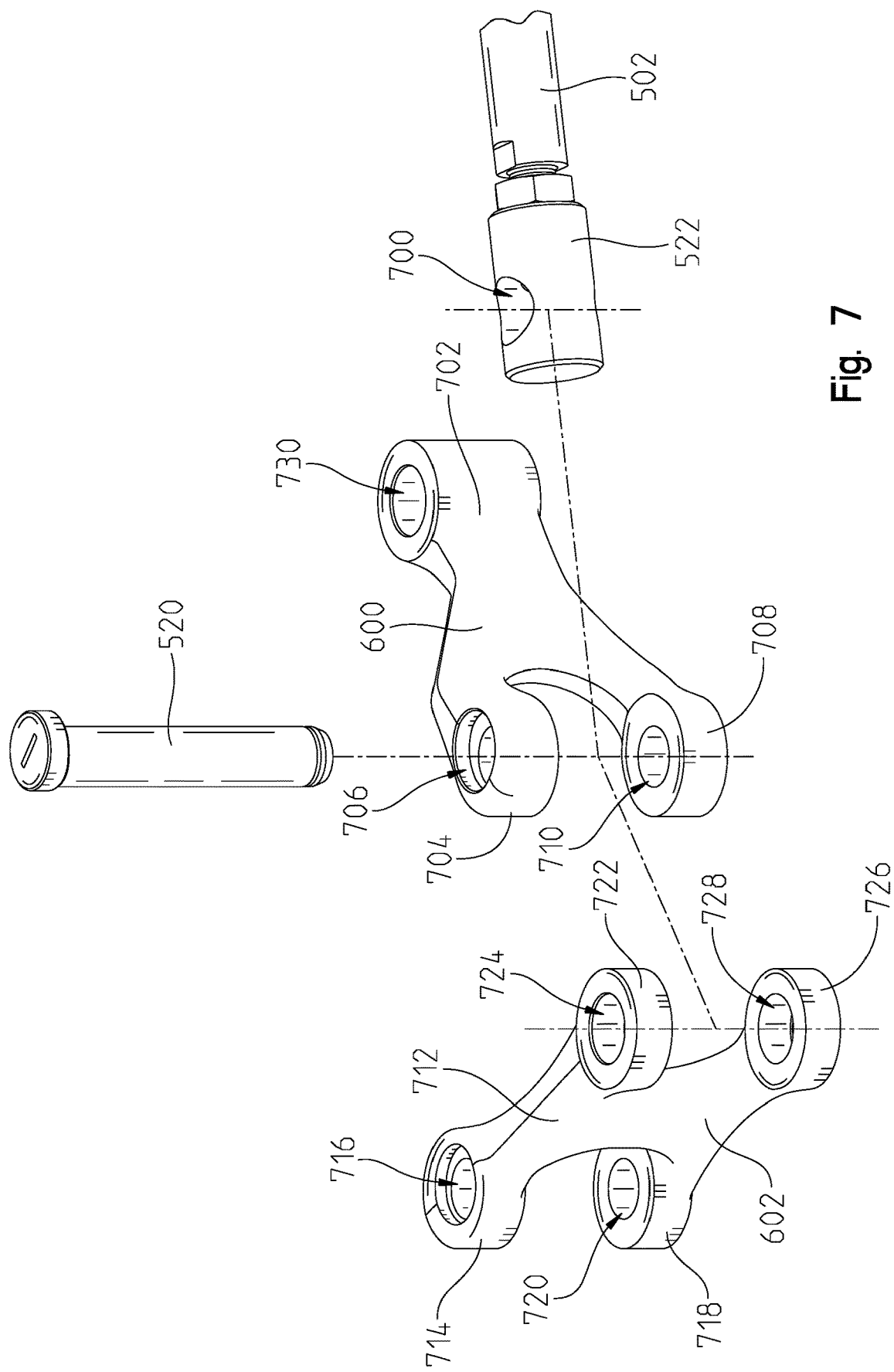
FIG. 7 is an exploded view of the fold hinge assembly of FIG. 6.

Referring to FIGS. 5-7, the fold hinge assembly 506 is shown in greater detail. In one embodiment, the fold hinge assembly 506 may be formed by a first fold hinge 600 and a second fold hinge 602. The first fold hinge 600 may be formed as a wishbone-shaped fold hinge including a first body 702. The first body 702 may include a first arm 704 and a second arm 708. The first arm 704 may be spaced from the second arm 708. Each of the first arm 704 and second arm 708 may define openings. For example, the first arm 704 may define a first opening 706 and the second arm 708 may define a second opening 710. The body 702 may also form a boss end which defines an opening 730. As shown in FIG. 8, the boss end of the body 702 may be aligned with the first hinge couplers 800 for receiving the fifth pin 524. In this embodiment, the fold hinge assembly 506 may be pivotally coupled to the inner wing frame 202. Moreover, as shown in FIG. 5, the fifth pin 524 may pivotally couple the inner wing frame 202 with the fold hinge assembly 506 at a fifth location 512.

In one embodiment, the second fold hinge 602 may be formed as an H-shaped fold hinge. The second fold hinge 602 may include a second body 712 forming a first arm 714, a second arm 718, a third arm 722, and a fourth arm 726. The first arm 714 may define a first opening 716, the second arm 718 may define a second opening 720, the third arm 722 may define a third opening 724, and the fourth arm 726 may define a fourth opening 728. The first arm 714 may be spaced vertically from the second arm 718, and the third arm 722 may be spaced vertically from the fourth arm 726. In some embodiments, the first opening 716 may be aligned with the second opening 720. In other embodiments, the third opening 724 may be aligned with the fourth opening 728.

In the embodiment of FIG. 8, the second hinge coupler 802 may be positioned between the first arm 714 and second arm 718 such that the second hinge coupler 802, the first arm 714 and second arm 718 are configured to receive the third pin 516. Thus, the fold hinge assembly 506 may be coupled to the outer wing frame 204 via the connection of the third pin 516, the second hinge coupler 802, the first arm 714, and the second arm 718. For purposes of this disclosure, and as shown in FIG. 5, the third pin 516 may pivotally couple the outer wing frame 204 with the fold hinge assembly 506 at a third location 508.

In several embodiments, and as shown in FIGS. 7 and 8, the first arm 704 and second arm 708 of the first fold hinge 600 may be aligned with the third arm 722 and fourth arm 726 of the second fold hinge 602 such that the first opening 706, second opening 710, third opening 724, and fourth opening 728 are axially aligned with one another for receiving a fourth pin 520. This orientation is shown particularly well in FIGS. 6 and 7. As shown in FIG. 6, the third arm 722 may be disposed in contact with or in close proximity with the first arm 704. Similarly, the fourth arm 726 may be disposed in contact with or in close proximity with the second arm 708. In this arrangement, the third arm 722 is spaced from the second arm 708 to define a gap therebetween. As shown in FIG. 5, the gap may receive a portion of the actuator assembly 208.

In the illustrated embodiment of FIGS. 5, 7 and 8, the actuator assembly 208 may include a base 500 and a rod 502.

To enable the outer wing frame 204 to move relative to the inner wing frame 202, the rod 502 may move in a reciprocating direction 506 between an extended position (i.e., the operating position 200) and a retracted position (i.e., the transport position 300 or shipping position 302). In some embodiments, the rod 502 may include a rod coupler 522 at its end furthest from the base 500. The rod coupler 522 may define an opening therethrough 700 as shown in FIG. 7. The rod coupler 522 may be disposed in the gap between the third arm 722 of the second fold hinge 602 and the second arm 708 of the first fold hinge 600. Further, the opening 700 defined by the rod coupler 522 may be axially aligned with the first opening 706, second opening 710, third opening 724, and fourth opening 728. In this manner, the fourth pin 520 may be disposed within each of these openings for coupling the actuator assembly 208, the first fold hinge 600 and the second fold hinge 602 to one another in a pivotal relationship. Moreover, as shown in FIG. 5, the connection between the fourth pin 520, the first fold hinge 600, the second fold hinge 602 and the actuator assembly 208 may formed at a fourth location 510.

As previously described, the actuator assembly 208 may be coupled to the fold hinge assembly 506 at one end and to the inner wing frame 202 at an opposite end. In one embodiment, the base 500 of the actuator assembly 208 may form a base coupler 528 as shown in FIGS. 5 and 8. The base coupler 528 may define an opening. Moreover, the inner wing frame 202 may include a pair of members which form a wing coupler 530. The wing coupler 530 also may define openings. As shown in FIG. 5, the base coupler 528 may be disposed between the pair of members which form the wing coupler 530 such that the openings of each are axially aligned and configured to receive a sixth pin 526. In this way, the actuator assembly 208 may be pivotally coupled to the inner wing frame 202 at a sixth location 514.

In the embodiment of FIG. 5, there are six locations identified where the inner wing frame 202 and outer wing frame 204 are coupled to one another to allow for pivotal movement therebetween. A spherical joint may be formed at the third location 508 via a spherical bearing 518 as shown. In some embodiments, and although not shown, any of the third location 508, fourth location 510, fifth location 512, and sixth location 514 may form spherical joints. In one embodiment, for example, the first hinge location 400 or second hinge location 402 may form a spherical joint. In another embodiment, the third location 508 or fifth location 512 of the fold hinge assembly may form a spherical joint. In a further embodiment, the fourth location 510 or sixth location 514 may form a spherical joint. In yet another embodiment, at least one of the first hinge location 400 or second hinge location 402 forms a spherical joint, at least one of the third location 508 or fifth location 512 forms a spherical joint, and at least one of the fourth location 510 or sixth location 514 forms a spherical joint. In yet other embodiments, all of the six locations may be spherical joints. In still yet other embodiments, four or five of the locations may be spherical joints. In some embodiments, where a location is not a spherical joint, it may be a pin joint. In those embodiments where the location is a spherical joint, at least one spherical bearing may be provided. Further, in some embodiments, a spherical joint may include one or two spherical bearings.

Figure 9A:
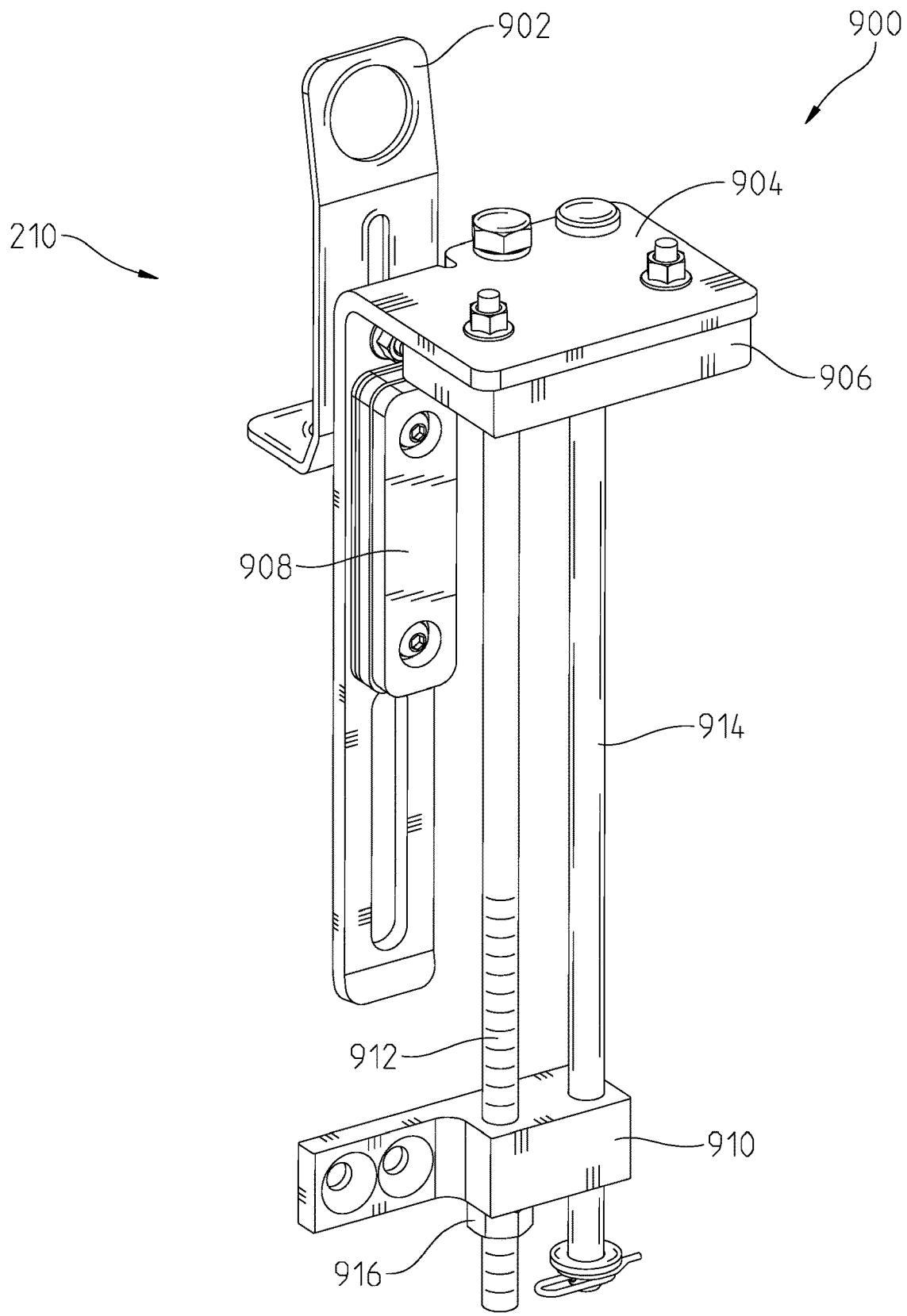
FIG. 9A is a perspective view of a lift assembly in an operating configuration.
Figure 9B:
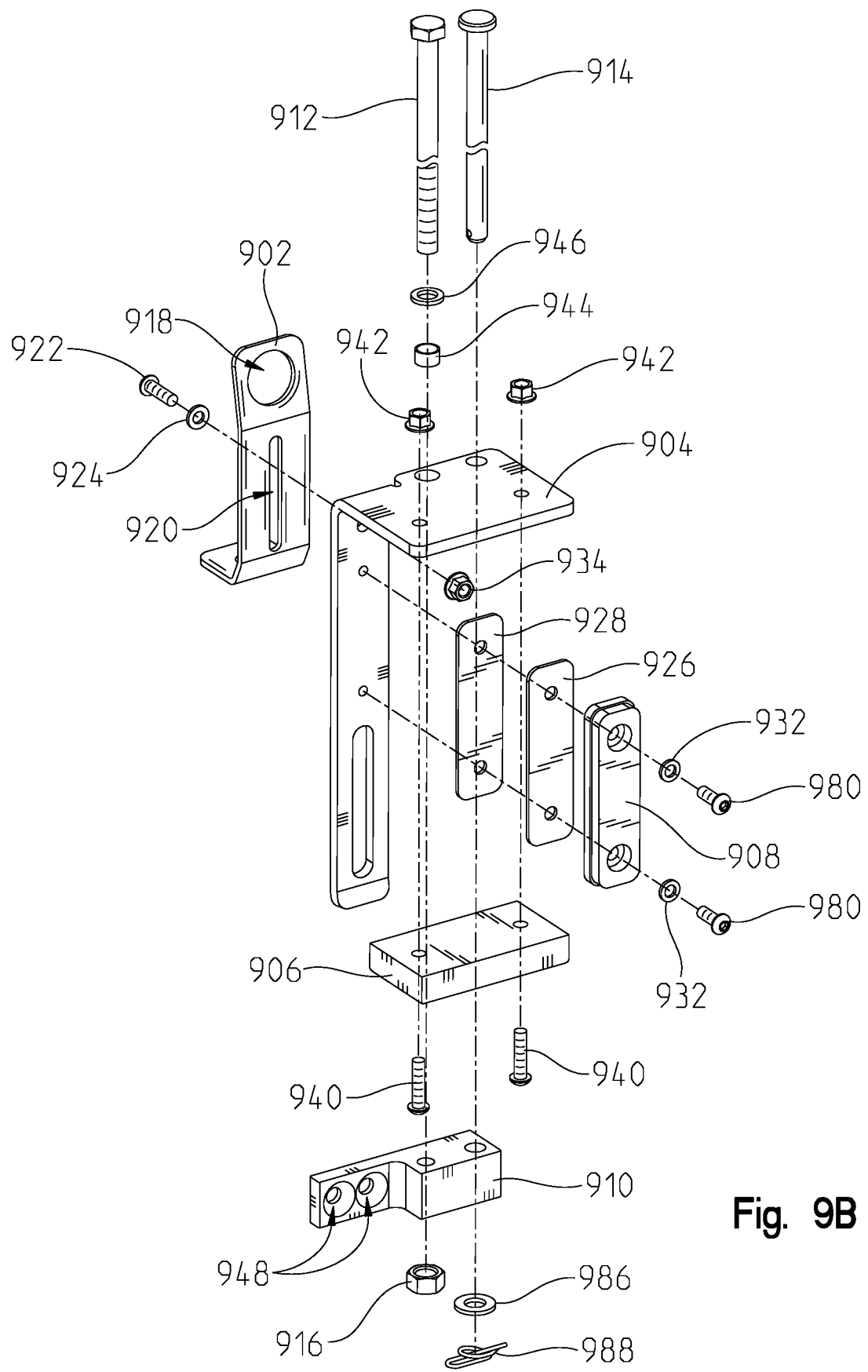
FIG. 9B is an exploded view of the lift assembly of FIG. 9A.

Turning to FIGS. 9A-B, the lift assembly 210 is shown in its operating configuration 900. In some embodiments, the lift assembly 210 may be coupled to the outer wing frame 204 as described previously. The lift assembly 210 may include a first bracket 902, a fold rest bracket 904, a mounting bracket 910, a first bumper or pad member 906, a second bumper or pad member 908, an adjustment bolt or rod 912 and a guide rod 914. The lift assembly 210 may include one or more jam nuts 916 which may be threadably coupled to the adjustment bolt or rod 912.

In one embodiment, the adjustment bolt or rod 912 may be a threaded rod which may be positioned relative to the mounting bracket 910 via the one or more jam nuts 916. The mounting bracket 910 may be coupled to the outer wing frame 204 via fasteners (not shown) which may be screwed, bolted, or otherwise coupled to the mounting bracket 910 via one or more openings 948 (see FIG. 9B). When the one or more jam nuts 916 are loosened, the adjustment bolt or rod 912 may be adjusted to raise or lower the outer wing frame 204. The adjustment bolt or rod 912 may be disposed within an opening formed in the fold rest bracket 904 and may be accommodated with a washer 946 and spacer 944. As shown in FIGS. 9A-B, the adjustment bolt or rod 912 may be coupled to the fold rest bracket 904 such that the lift assembly 210 may be raised and lowered. An impact or torque wrench (not shown), for example, may be used to apply torque to the adjustment bolt or rod 912 to induce movement of the lift assembly 210 relative to the outer wing frame 204.

The guide rod 910 may provide support to the lift assembly 210 and reduces or prevents bending during reconfiguration of the spray boom. In one embodiment, the guide rod 910 may be positioned within a clearance opening in the mounting bracket 910 thereby allowing the guide rod 910 to move with the lift assembly 210. The guide rod 910 may include a washer 936 and coupler 938 coupled at one end thereof. The coupler 938, for example, may be a pin that is disposable within an opening formed in the guide rod 910.

Referring to FIG. 9B, one embodiment of the lift assembly 210 is shown in an exploded view. Here, the first bracket 902 may include a first opening 918 which may be used for positioning the outer wing frame 204 relative to the inner wing frame 202 in the shipping position 302. This will be described in further detail below. In addition, the bracket 902 may include an elongated slot 920 configured to receive a mounting fastener 922. A washer 924 may accompany the mounting fastener 922 when coupling the first bracket 902 through an opening formed in the fold rest bracket 904. A nut 934 or similar fastener may be used for coupling to the mounting fastener 922 to securely couple the first bracket 902 to the fold rest bracket 904 in the operating configuration 900.

In one embodiment, the operating configuration may correspond to the position of the first bracket 902 and the lift assembly 210 as a whole in the operating position 200 or transport position 300 of the spray boom. As will be described below with respect to FIG. 10, the lift assembly 210 and first bracket 902 are not disposed in the operating configuration 900 when the spray boom is disposed in the shipping position 302. The first bracket 902 may be removably coupled to the fold rest bracket 904 by disassembly the mounting fastener 922.

The first bumper member 906 may be formed of a foam, resin, plastic or other material. The first bumper member 906 may be coupled to the fold rest bracket 904 via a plurality of fasteners including one or more screws or bolts 940 and one or more nuts 942.

The second bumper member 908 may be formed of a foam, resin, plastic or other material. The second bumper 908 may be coupled to the fold rest bracket 904 along with a first plate 926 and a second plate 928 as shown in FIG. 9B. A pair of fasteners 930 and washers 932 may be used for coupling the second bumper member 908, first plate 926, and second plate 928 to the fold rest bracket 904.

Figure 10:
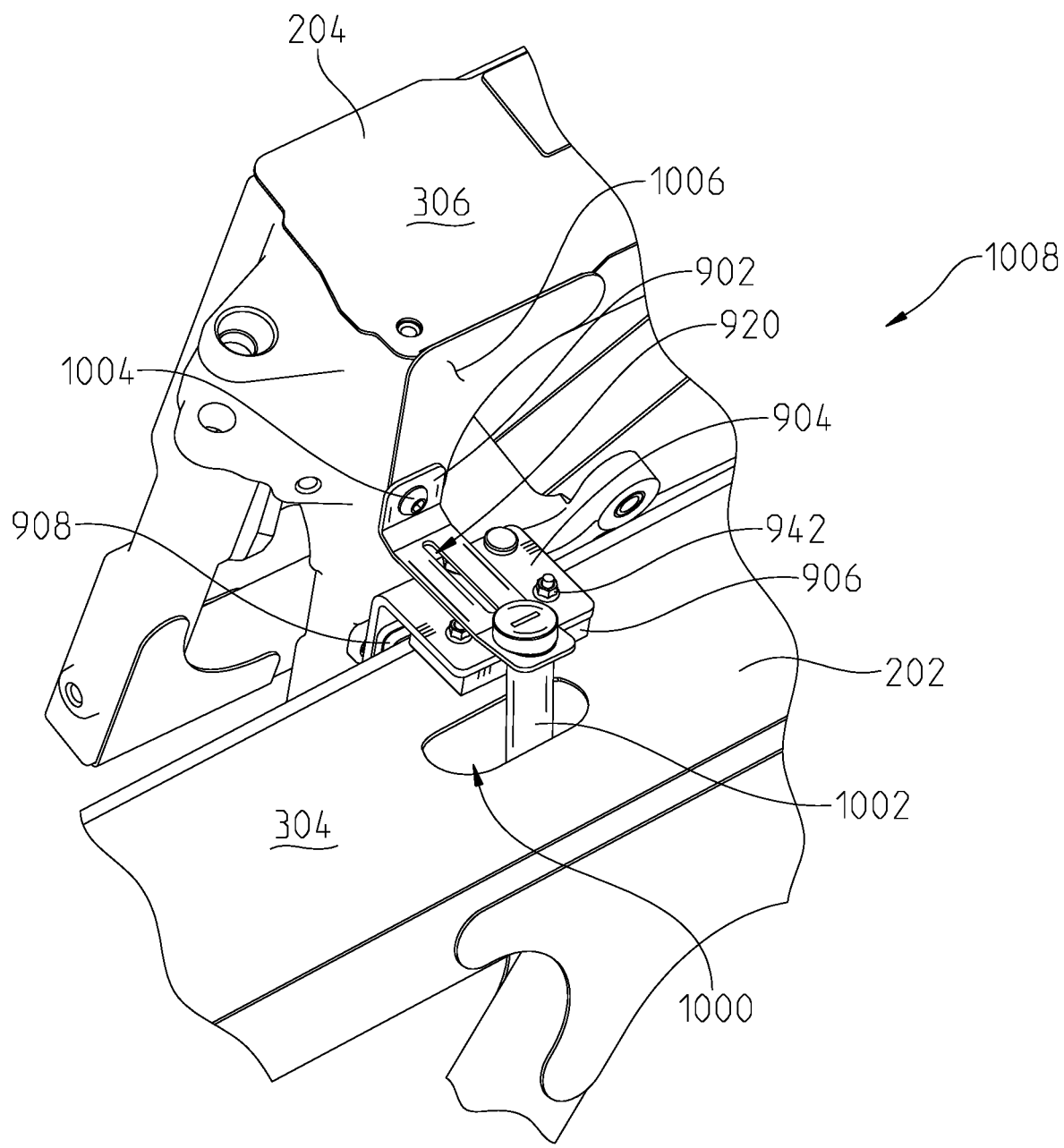
FIG. 10 is a perspective view of the lift assembly in a shipping configuration.

As noted, the embodiment of FIGS. 9A and 9B is representative of the lift assembly 210 in its operating configuration 900. Referring to FIG. 10, the lift assembly 210 is shown in one embodiment in its shipping configuration 1008. In the shipping configuration 1008, the spray boom is configured in the shipping position 302 so that the spray boom may be transported from the factory, for example, to a dealership, field or other destination. In the shipping configuration 1008, the outer wing frame 204 may be lifted or raised via the lift assembly 210 in order to be angularly disposed relative to the inner wing frame 202 at a desired rake angle. In FIG. 10, the outer wing frame 204 is angularly positioned at the desired rake angle relative to the inner wing frame 202. In this configuration 1008, the aforementioned mounting fastener 922 is removed and the first bracket 902 may be decoupled from the fold rest bracket 904. The first bracket 902 may be repositioned such that it can be coupled to an inner surface 1006 of the outer wing frame 204 via the mounting fastener 922 or another fastener 1004.

As shown in the embodiment of FIG. 10, the inner wing frame 202 may include a slot 1000 defined in an upper surface 304 thereof. The slot 1000 may be sized for receiving a pin 1002. The pin 1002 may be disposed within the opening 918 of the first bracket 902. The pin 1002 may therefore be disposed within the opening 918 and slot 1000 to limit movement of the outer wing frame 204 relative to the inner wing frame 202. Thus, the opening 918 in the first bracket 902 is configured to hold the pin 1002 in place. In some embodiments, a fastener or other form of coupling mechanism may be coupled to the pin 1002 once it is disposed within the opening 918 and slot 1000 to reduce movement thereof.

In some embodiments, the first bumper member 906 and second bumper member 908 may be disposed in contact with the inner wing frame 202 in the shipping configuration 1008. In other embodiments, the first bumper member 906 and second bumper member 908 may be in close proximity without contacting the inner wing frame 202. With the bumper members contacting the inner wing frame, the outer wing frame 204 may be raised or lowered relative to the inner wing frame 202 to adjust the rake angle therebetween.

In one embodiment, the pin 1002 may comprise either the first pin 404 or the second pin 406. In this embodiment, either the first pin 404 or second pin 406 may be removed from the hinge assembly 206 and used for coupling the outer wing frame 204 and inner wing frame 202 in the shipping position 302. In one embodiment, the first hinge location 400 may comprise a spherical joint and the second hinge location 402 may comprise a pin joint. In this embodiment, the second pin 406 may be removed and used as pin 1002 for coupling the inner and outer wing frames in the shipping position 302. In another embodiment, the first hinge location 400 may comprise a pin joint and the second hinge location 402 may comprise a spherical joint. In this embodiment, the first pin 404 may be removed and used as pin 1002 for coupling the inner and outer wing frames in the shipping position 302. In a further embodiment, both the first hinge location 400 and the second hinge location 402 may comprise a spherical joint. In this embodiment, either the first pin 404 or the second pin 406 may be removed and used as pin 1002 for coupling the inner and outer wing frames in the shipping position 302.

Figure 11:
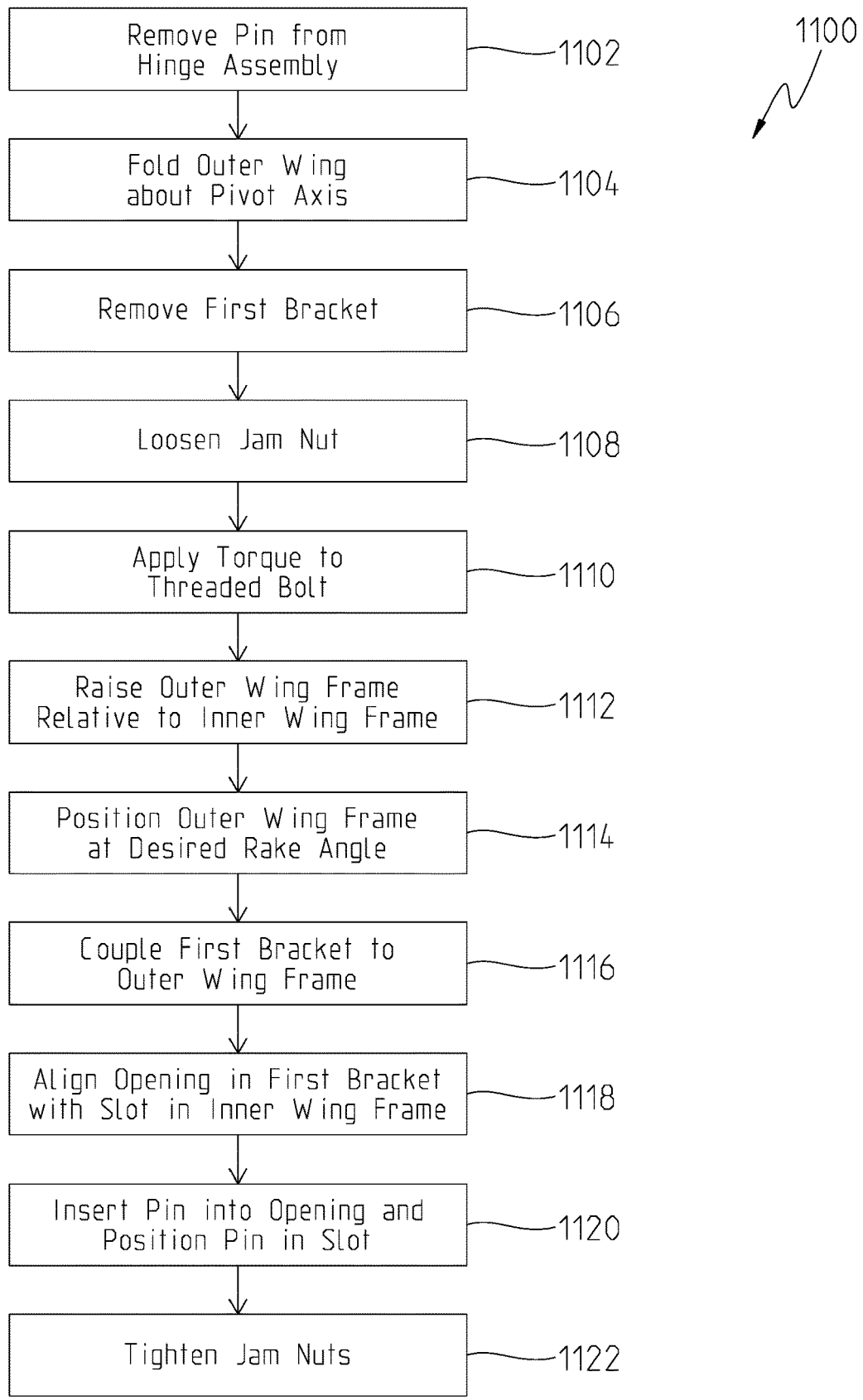
FIG. 11 is a flow diagram of a method for reconfiguring the inner and outer wing boom frames from an operating position to a shipping position.

Referring to FIG. 11, one embodiment of a method is provided as a flowchart 1100 for reconfiguring a spray boom having an inner wing frame 202 and an outer wing frame 204 from an operating position 200 to a shipping position 302 at a desired rake angle. The flowchart 1100 may illustrate one or more operations involved in repositioning the spray boom. In some embodiments, the operations of the flowchart 1100 may be performed using one or more of the configurations described in further detail below. The various operations or configurations shown in the flowchart 1100 may be performed in different sequential orders than what is shown in FIG. 11. Moreover, one or more of the operations or configurations may not be performed in some embodiments, while in other embodiments there may be additional operations or configurations performed.

In the embodiment of FIG. 11, the flowchart 1100 may begin at 1102 with the spray boom in its operating position similar to that shown in FIG. 2. At 1102, either the first pin 404 is removed from the first hinge location 400 or the second pin 406 is removed from the second hinge location 402. In the event only one of the two hinge locations is a spherical joint, then the pin from the pin joint is removed and the pin from the spherical joint is left in place. By removing the pin from the pin joint and leaving the pin at the spherical joint, the hinge assembly 206 may have a greater degree of freedom about the spherical joint to allow the outer wing frame 204 to be pivotally adjusted about the spherical joint relative to the inner wing frame 202 to achieve the desired rake angle.

At 1104 in the flowchart, the outer wing frame 204 may be folded about the pivot axis toward the inner wing frame 202. In other embodiments, the outer wing frame 204 may be folded before the first or second pin is removed.

At 1106, the first bracket 902 may be removed or decoupled from the lift assembly 210. For example, the mounting fastener or bolt 922 may be disassembled for removing the first bracket 902. As previously noted, the first bracket 902 may be useful in the operating position 300 and shipping configuration 302. In the operating configuration 900 of the lift assembly 210 (e.g., FIG. 9A), the first bracket 902 may brace or otherwise support the lift assembly. The slot 920 in the first bracket 902 may allow for height adjustability. In the shipping configuration 302, the first bracket 902 may be configured to hold the first pin 404 or second pin 406 as will be described.

At 1108 in the flowchart, the one or more jam nuts 916 may be loosened. By loosening the one or more jam nuts 916, the lift assembly is allowed to be raised or lowered. In FIG. 9A, there is a jam nut shown coupled to the adjustment bolt or rod 912 below the mounting bracket 910. In other embodiments, there may be a jam nut 910 located above the mounting bracket 910 and coupled to the adjustment bolt or rod 912. In some embodiments, the one or more jam nuts 916 may be threadably coupled to the adjustment bolt or rod 912. In other embodiments, the one or more jam nuts 916 may be coupled to the adjustment bolt or rod 912 in a manner other than via threads. In any event, once the one or more jam nuts 916 are loosened, the lift assembly 210 may be raised or lowered.

At 1110 in the flowchart, torque may be applied to the adjustment bolt or rod 912 in one direction to raise the outer boom frame and an opposite direction to lower it. An impact wrench, for example, or other tool may be used to apply torque to the adjustment bolt or rod 912. Other mechanisms may be used as well.

One the adjustment bolt or rod 912 is rotated in 1110, at 1112 the outer wing frame 204 may be raised relative to the inner wing frame 202 to achieve a desired rake angle at 1114 in the flowchart. The lift assembly 210 may be configured to control the height of the outer wing frame 204 relative to the inner wing frame 202 to achieve the desired rake angle. In this embodiment, the lift assembly 210 may be coupled directly with the outer wing frame 204 but may be brought into contact with the inner wing frame 202 in order to alter the height or position of the outer wing frame 204 relative to the inner wing frame 204 at 1112 of the flow chart 1100. In other embodiments, the lift assembly 210 may be coupled directly to the inner wing frame 202 and brought into contact with the outer wing frame 204 at 1104 of the flowchart 1100. In some embodiments, the lift assembly 210 may be removably coupled from the outer wing frame 204 or inner wing frame 202 such that it may be coupled only when the sprayer boom is being reconfigured to a different configuration.

In other embodiments, a hoist, forklift, or other mechanism may be used for lifting the outer wing frame relative 204 to the inner wing frame 202 to achieve a desired rake angle.

At 1114 in the flowchart 1100, the outer wing frame 204 may be adjusted relative to the inner wing frame 202 to achieve a desired rake angle. As the adjustment bolt or rod 912 is torqued to raise the outer wing frame 204, the first bumper member 906 and second bumper member 908 may be in contact with the inner wing frame 202 such that the inner wing frame 202 remains substantially stationary as the outer wing frame 204 is raised to the shipping configuration 302. As the outer wing frame 204 is being raised to the shipping configuration 302, the guide rod 914 provides support to the lift assembly 210 to avoid bending or other possible damage thereto.

Once the outer wing frame 204 is raised to a desired height to satisfy a desired rake angle, at 1116 of the flowchart 1100 the first bracket 902 may be coupled to the outer wing frame 204 using a new fastener 1004 or the mounting fastener or bolt 922. In the shipping configuration 1008 of FIG. 10, the first bracket 902 may be coupled to the inner surface 1006 of the outer boom frame 204 and extend in a direction towards the inner wing frame 202. In this configuration, the slot 920 in the first bracket 902 may be defined in a longitudinal direction which is substantially perpendicular to the inner wing slot 1000 defined in the inner wing frame 202. The inner wing slot 1000 may be disposed in a transverse direction relative to the slot 920 in the first bracket 902.

Once the first bracket 902 is coupled to the outer wing frame 204, at 1118 of the flowchart 1100 the slot 920 and inner wing slot 1000 may be aligned with one another so that at 1120 the first pin 404 or second pin 406 may be inserted into the slot 920 and inner wing slot 1000 such as shown in FIG. 10. With the first pin 404 or second pin 406 in both slots, the freedom of movement between the inner wing frame 202 and outer wing frame 204 may be limited.

As the first pin 404 or second pin 406 are inserted into the slots at 1120, at 1122 of the flowchart 1100 the one or more jam nuts 916 may be tightened so that the outer wing frame 204 is held in place relative to the inner wing frame 202. At this point, the sprayer boom is in its shipping configuration 302 and the outer wing frame 204 is offset relative to the inner wing frame 202 at the desired rake angle.

The process of reconfiguring the spray boom from the shipping configuration 302 to the operating configuration 200 or the transport configuration 300 may include one or more of the same steps as in the flowchart 1100 of FIG. 11 but performed in a reverse order. For instance, the one or more jam nuts 916 may be loosened so the outer wing frame 204 may be lowered relative to the inner wing frame 202. Once the jam nuts 916, for example, the first pin 404 or second pin 406 may be removed from the slot 920 and inner wing slot 1000. Following the removal of the pin, the first bracket 902 may be decoupled from the outer wing frame 204 from the position shown in FIG. 10.

The outer wing frame 204 may be lowered relative to the inner wing frame 202 by applying torque to the adjustment bolt or rod 912 in an opposition direction from that at 1110 in the flowchart 1100. As the outer wing frame 204 is lowered, the first bracket 902 may be coupled via the mounting fastener 922 to the lift assembly 210 as in FIG. 9A. Moreover, as the outer wing frame 204 is lowered, the one or more jam nuts 916 may be tightened once the outer wing frame 204 is at the height for the transport configuration 300 or operating configuration 200. The first pin 404 or second pin 406 may be assembled within the respective hinge members (i.e., the first member 408, second member 410, and third member 412 at an upper or first hinge location 400 or the fourth member 414, fifth member 416, and sixth member 418 at a lower or second hinge location 402). To align the different members, the adjustment bolt or rod 912 may be operably manipulated (e.g., via manual adjustment, applying torque, or maneuvering the bolt to raise or lower the outer wing frame 204 until the various members are aligned). Once the first pin 404 or second pin 406 are coupled with the hinge assembly 206, the spray boom may be configured in either the operating configuration 200 (i.e., as in FIG. 2 by folding the outer wing frame 204 about the pivot axis A-A away from the inner wing frame 202) or the transport configuration 300 (i.e., as in FIG. 3A).

As described previously, the use of a plurality of spherical joints in the hinge assembly 206 and actuator assembly 208 permits a unique freedom of movement of the outer wing frame 204 with respect to the inner wing frame 202 to achieve various rake angles. Specifically, the use of a first spherical joint along the fold hinge or pivot axis A-A at either the first location 400 or second location 402, a second spherical joint at the third location 508 or fifth location 512 of the fold hinge assembly 506, and a third spherical joint at the fourth location 510 or sixth location 514 of the actuator assembly 208 may provide a degree of freedom that otherwise cannot be obtained. In addition, the second spherical joint at either the third location 508 or fifth location 512 may be disposed offset from the pivot axis A-A.

The removal of the first pin 404 or second pin 406, as well as a spherical joint at the location of the pin which remains installed, may provide some range of translational movement in a fore-aft direction along the pivot axis A-A that is otherwise restricted or limited with both pins at the first and second locations.

In some embodiments of the present disclosure, the locations or positions at which the spherical joints are located does not change. In other words, the spherical joints do not change or move locations in order to reconfigure the outer wing frame 204 relative to the inner wing frame 202. Instead, only the outer wing frame 204 is moved relative to the inner wing frame 202 as described herein to maneuver the spray boom to its various configurations.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A spray boom assembly, comprising:
a first boom frame;
a second boom frame pivotally coupled via a hinge assembly to the first boom frame, the first and second boom frames being pivotally coupled about a pivot axis; and
an actuator assembly configured to pivot the second boom frame relative to the first boom frame, the actuator assembly comprising a base portion and a rod portion, the rod portion configured to move relative to the base portion;
wherein, the hinge assembly comprises a first joint location, a second joint location, a third joint location, a fourth joint location, and a fifth joint location;
wherein, the rod portion of the actuator assembly is coupled to the hinge assembly at the fourth joint location and the base portion is coupled to the first boom frame at a sixth joint location;
wherein, at least three of the first, second, third, fourth, fifth and sixth joint locations comprises a spherical joint.

2. The spray boom assembly of claim 1, wherein the first and second joint locations are located along the pivot axis.

3. The spray boom assembly of claim 2, wherein the third joint location, the fourth joint location and the fifth joint location are located offset from the pivot axis.

4. The spray boom assembly of claim 1, wherein at least one of the first, second, third, fourth, fifth, and sixth joint locations comprises a pin joint.

5. The spray boom assembly of claim 1, wherein each joint location comprises a pin.

6. The spray boom assembly of claim 1, wherein the first boom frame is coupled to the hinge assembly at the fifth joint location.

7. The spray boom assembly of claim 1, wherein the second boom frame is coupled to the hinge assembly at the third joint location.

8. The spray boom assembly of claim 1, wherein the hinge assembly comprises a fold hinge assembly formed by a first fold hinge and a second fold hinge, the fold hinge assembly being coupled to the second boom frame at the third joint location, the first boom frame at the fifth joint location, and the actuator assembly at the fourth joint location.

9. The spray boom assembly of claim 1, wherein each spherical joint remains at its respective joint location during pivotal movement of the second boom frame relative to the first boom frame.

10. The spray boom assembly of claim 1, wherein the second boom frame is movable relative to the first boom frame between an operating configuration, a shipping configuration, and a transport configuration, wherein in the shipping configuration:
the first boom frame and second boom frame are not coupled to one another at the first joint location via a pin;
the second joint location comprises a spherical joint; and
the second boom frame is folded inwardly and positioned adjacent the first boom frame, wherein the second boom frame is angularly disposed relative to the second boom frame at a rake angle.

11. A spray boom assembly, comprising:
a first boom frame;
a second boom frame pivotally coupled via a hinge assembly to the first boom frame, the first and second boom frames being pivotally coupled about a pivot axis; and
an actuator assembly configured to pivot the second boom frame relative to the first boom frame, the actuator assembly comprising a first end and a second end, the first end configured to move relative to the second end;
wherein, the hinge assembly comprises a first joint location, a second joint location, a third joint location, a fourth joint location, and a fifth joint location, the first and second joint locations being positioned along the pivot axis;
wherein, the first end of the actuator assembly is coupled to the hinge assembly at the fourth joint location and the second end thereof is coupled to the first boom frame at a sixth joint location, the sixth joint location being spaced from the hinge assembly;
wherein, at least the first joint location or second joint location comprises a first spherical joint, the third joint location or the fifth joint location comprises a second spherical joint, and the fourth joint location or the sixth joint location comprises a third spherical joint.

12. The spray boom assembly of claim 11, wherein one of the first, second, third, fourth, fifth, or sixth joint locations comprises a fourth spherical joint.

13. The spray boom assembly of claim 11, wherein each of the first, second, and third spherical joints remain at their respective joint location during movement of the second boom frame relative to the first boom frame.

14. The spray boom assembly of claim 11, wherein the second boom frame and the first boom frame are disposable in an operating position and a shipping configuration;
wherein, in the operating configuration:
the first boom frame and second boom frame are coupled to one another at the first joint location via a first pin and at the second joint location via a second pin, the second joint location comprising a spherical joint;
wherein in the shipping configuration:
the first pin is removed from the first joint location such that the second boom frame is movable relative to the first boom frame along the pivot axis; and
the second boom frame is folded inwardly and positioned adjacent the first boom frame, wherein the second boom frame is angularly disposed relative to the second boom frame at a rake angle.

15. The spray boom assembly of claim 14, further comprising a lift assembly coupled to the second boom frame, the lift assembly comprising:
a fold rest bracket;
a mounting bracket;
at least one bumper member coupled to the fold rest bracket;
a first bracket coupled to the fold rest bracket; and
an adjustment rod coupled between the fold rest bracket and the mounting bracket, wherein the adjustment rod is rotationally driven to move the second boom frame relative to the first boom frame.

16. The spray boom assembly of claim 15, wherein the first bracket comprises an opening;
wherein, in the operating configuration, the first bracket is coupled to and supports the fold rest bracket;
wherein, in the shipping configuration, the first bracket is removed from the fold rest bracket and coupled to the second boom frame, the first bracket being positioned such that the first pin is disposed within the opening in the first bracket and a slot defined in the first boom frame.

17. The spray boom assembly of claim 15, wherein the lift assembly comprises a guide rod coupled between the fold rest bracket and the mounting bracket, the guide rod being generally parallel to and offset from the adjustment rod.

18. The spray boom assembly of claim 15, wherein the lift assembly comprises at least one jam nut coupled to the adjustment rod, wherein the at least one jam nut is loosened to allow movement of the adjustment rod relative to the mounting bracket.

19. A spray boom assembly, comprising:
a first boom frame;
a second boom frame pivotally coupled via a hinge assembly to the first boom frame, the first and second boom frames being pivotally coupled about a pivot axis;
an actuator assembly configured to pivot the second boom frame relative to the first boom frame; and
a lift assembly coupled to the second boom frame, the lift assembly comprising a fold rest bracket, a mounting bracket, at least one bumper member coupled to the fold rest bracket, a first bracket coupled to the fold rest bracket, and an adjustment rod coupled between the fold rest bracket and the mounting bracket, wherein the adjustment rod is rotationally driven to move the second boom frame relative to the first boom frame;
wherein, the hinge assembly comprises a first joint location, a second joint location, a third joint location, a fourth joint location, and a fifth joint location, the first and second joint locations being positioned along the pivot axis;
wherein, a first end of the actuator assembly is coupled to the hinge assembly at the fourth joint location and a second end thereof is coupled to the first boom frame at a sixth joint location;
wherein, at least the first joint location or second joint location comprises a first spherical joint, the third joint location or the fifth joint location comprises a second spherical joint, and the fourth joint location or the sixth joint location comprises a third spherical joint;
wherein the second boom frame and the first boom frame are disposable in an operating position and a shipping configuration;
wherein, in the operating configuration:
the first boom frame and second boom frame are coupled to one another at the first joint location via a first pin and at the second joint location via a second pin, the second joint location comprising a spherical joint;
wherein in the shipping configuration:
the first pin is removed from the first joint location such that the second boom frame is movable relative to the first boom frame along the pivot axis; and
the second boom frame is folded inwardly and positioned adjacent the first boom frame, wherein the second boom frame is angularly disposed relative to the second boom frame at a rake angle.

20. The spray boom assembly of claim 19, wherein the first bracket comprises an opening;
wherein, in the operating configuration, the first bracket is coupled to and supports the fold rest bracket;
wherein, in the shipping configuration, the first bracket is removed from the fold rest bracket and coupled to the second boom frame, the first bracket being positioned such that the first pin is disposed within the opening in the first bracket and a slot defined in the first boom frame.

* * * * *